US012438604B2

United States Patent
Lu et al.

(10) Patent No.: US 12,438,604 B2
(45) Date of Patent: Oct. 7, 2025

(54) METHOD AND APPARATUS FOR SYNCHRONIZING TIME BY PARSING SATELLITE NAVIGATION DATA

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 189 days.

(21) Appl. No.: 18/276,244

(22) PCT Filed: Mar. 23, 2022

(86) PCT No.: PCT/CN2022/082559
§ 371 (c)(1),
(2) Date: Aug. 7, 2023

(87) PCT Pub. No.: WO2022/257547
PCT Pub. Date: Dec. 15, 2022

(65) Prior Publication Data
US 2024/0120991 A1   Apr. 11, 2024

(30) Foreign Application Priority Data

Jun. 11, 2021   (CN) .......................... 202110650533.4

(51) Int. Cl.
*H04B 7/185*   (2006.01)
(52) U.S. Cl.
CPC ............... *H04B 7/18519* (2013.01)
(58) Field of Classification Search
CPC .. H04B 7/18519; H04J 3/0658; H04J 3/0682; H04J 3/0638; H04J 3/0661; H04J 3/0673
(Continued)

(56) References Cited

U.S. PATENT DOCUMENTS

2005/0203750 A1   9/2005 Miyamoto et al.
2013/0069824 A1   3/2013 Madhani et al.
(Continued)

FOREIGN PATENT DOCUMENTS

CN   102692634   9/2012
CN   103093753   5/2013
(Continued)

OTHER PUBLICATIONS

International Search Report (Form PCT/ISA/210) of PCT/CN2022/082559, mailed on Jun. 16, 2022, with English translation thereof, pp. 1-7.
(Continued)

*Primary Examiner* — Robert J Lopata
(74) *Attorney, Agent, or Firm* — JCIPRNET (57) ABSTRACT

The present application presents a method and an apparatus for synchronizing time by parsing satellite navigation data. A service application obtains current time of a system and caches it as a first time variable, receives and parses the satellite navigation data to obtain all character strings, obtains a character string as a current character string to be processed, determines a type of a system protocol identifier, if it is a preset system protocol identifier, converts a time field of the current character string to be processed into a local time zone time value for storing, obtains the current time and stores it as a second time variable, obtains a first time compensation value according to the first and second time variables, obtains satellite navigation time according to the first time compensation value and the maximum local time zone time value and sets system time as satellite navigation time.

20 Claims, 4 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2014/0156702 | A1 | 6/2014 | Shyamsunder et al. |
| 2021/0021362 | A1* | 1/2021 | Arai ...................... H04J 3/0644 |
| 2021/0159995 | A1* | 5/2021 | Zhang ..................... G01S 17/86 |
| 2022/0034676 | A1* | 2/2022 | Lee ..................... G01C 21/3423 |

FOREIGN PATENT DOCUMENTS

| | | |
|---|---|---|
| CN | 104991263 | 10/2015 |
| CN | 105527633 | 4/2016 |
| CN | 106292265 | 1/2017 |
| CN | 108279430 | 7/2018 |
| CN | 109547213 | 3/2019 |
| CN | 110289903 | 9/2019 |
| CN | 111007712 | 4/2020 |
| CN | 111046252 | 4/2020 |
| CN | 113114346 | 7/2021 |
| WO | 2020013284 | 1/2020 |

OTHER PUBLICATIONS

"Written Opinion of the International Searching Authority (Form PCT/ISA/237) of PCT/CN2022/082559," mailed on Jun. 16, 2022, with English translation thereof, pp. 1-8.

"Office Action of China Counterpart Application", with English translation thereof, issued on Jul. 23, 2021, p. 1-p. 10.

"Notification to Grant Patent Right for Invention of China Counterpart Application", with English translation thereof, Issued on Aug. 6, 2021, p. 1-p. 5.

* cited by examiner

METHOD AND APPARATUS FOR SYNCHRONIZING TIME BY PARSING SATELLITE NAVIGATION DATA

CROSS-REFERENCE TO RELATED APPLICATION

This application is a 371 of international application of PCT application serial no. PCT/CN2022/082559, and filed on Mar. 23, 2022, which claims priority benefit of Chinese Patent Application No. 202110650533.4, and filed on Jun. 11, 2021. The entirety of each of the above mentioned patent applications is hereby incorporated by reference herein and made a part of this specification.

TECHNICAL FIELD

The present application relates to data processing field, and in particular, to a method and an apparatus for synchronizing time by parsing satellite navigation data.

BACKGROUND

With high speed development of information technology and network technology, requirement of a device for time accuracy becomes higher and higher. In the related art, it generally adapts network time service for synchronizing time. The network time service is for providing time service for users by specifying a plurality of time source websites which can be compared time with each other. The network time service takes a communication channel as a medium to synchronize time, for example, a computer network, and a telephone network. The time service method requires occupying channel time, high requirement for reliability of a channel. In addition, due to the varying time delay for a time signal being transmitted to different devices via communication channels, it can only meet need of medium time accuracy. Therefore, how to provide a method for synchronizing time with high accuracy becomes an urgent technical problem.

SUMMARY

A purpose of the present application is providing a method and an apparatus for synchronizing time by parsing satellite navigation data, which realize high accuracy for synchronizing time.

In a first aspect, the present application provides a method for synchronizing time by parsing satellite navigation data, which includes the following steps:

Step 101, obtaining, by a service application, current time of a system and caching the current time of the system as a first time variable, receiving satellite navigation data via a serial port, parsing the satellite navigation data to obtain all character strings contained in the satellite navigation data and storing all the character strings;

Step 102, obtaining, by the service application, a stored character string as a current character string to be processed, obtaining a system protocol identifier from a satellite system identifier of the current character string to be processed, determining a type of the system protocol identifier, if the type of the system protocol identifier is a preset system protocol identifier, executing Step 103; otherwise, executing Step 104;

Step 103, converting, by the service application, a time field of the current character string to be processed into a local time zone time value of the current character string to be processed and storing the local time zone time value of the current character string to be processed, executing Step 104;

Step 104, determining, by the service application, whether an un-obtained character string to be processed exists, if yes, going back to Step 102; otherwise, executing Step 105;

Step 105, obtaining, by the service application, current time of the system and storing the current time of the system as a second time variable, obtaining a first time compensation value according to a stored first time variable and a stored second time variable;

Step 106, obtaining, by the service application, a maximum local time zone time value from all stored local time zone time values, obtaining satellite navigation time according to the first time compensation value and the maximum local time zone time value;

Step 107, setting, by the service application, the current time of the system as satellite navigation time.

In a second aspect, the disclosure provides an apparatus for synchronizing time by parsing satellite navigation data, which includes: a receiving module, a first obtaining module, a parsing module, a second obtaining module, a first determining module, a converting module, a second determining module, a third obtaining module, a computing module and a setting module;

the receiving module is configured to receive satellite navigation data via a serial port;

the first obtaining module is configured to obtain current time of a system and cache the current time of the system as a first time variable;

the parsing module is configured to parse the satellite navigation data to obtain all character strings contained in the satellite navigation data and store all the character strings;

the second obtaining module is configured to obtain a stored character string as a current character string to be processed, obtain a system protocol identifier of the current character string to be processed from the satellite system identifier of the current character string to be processed;

the first determining module is configured to determine a type of the system protocol identifier, if the type is a preset system protocol identifier, trigger the converting module; otherwise, trigger the second determining module;

the converting module is configured to convert a time field of the current character string to be processed into a local time zone time value of the current character string to be processed and store the local time zone time value of the current character string to be processed, and trigger the second determining module;

the second determining module is configured to determine whether an un-obtained character string to be processed exists, if yes, trigger the second obtaining module, otherwise, trigger a third obtaining module;

the third obtaining module is configured to obtain current time of the system and store the current time of the system as the second time variable;

the computing module is configured to obtain a first time compensation value according to a stored first time variable and a stored second time variable;

the third obtaining module is further configured to obtain a maximum local time zone time value of all stored local time zone time values;

the computing module is further configured to obtain satellite navigation time according to the first time compensation value and the maximum local time zone time value; and the setting module is configured to set the current time of the system as satellite navigation time.

In a third aspect, the present application provides an electronic device, including: a processor and a memory;

the memory is configured to store a computer program;

the processor is configured to run the computer program stored by the memory to realize the method for synchronizing time by parsing satellite navigation data of the present application.

In a fourth aspect, the present application provides a computer readable storage medium, configured to store a computer program which, when running on a computer, enables the computer to execute the method for synchronizing time by parsing satellite navigation data of the present application.

The present application provides the method and apparatus for synchronizing time by parsing satellite navigation data, which improve accuracy for synchronizing local system time.

DESCRIPTION OF EMBODIMENTS

The present application provides a method and an apparatus for synchronizing time by parsing satellite navigation data. The following is a detailed explanation of the specific implementation of the present application, with reference to the accompanying drawings. The examples of the embodiments are illustrated in the accompanying drawings. The embodiments described below with reference to the accompanying drawings are exemplary and are used to explain the present application, rather than being interpreted as limiting the present application.

Unless defined otherwise, all terms (including technical and scientific terms) used herein have the same meaning as commonly understood by one of ordinary skill in the art to which the present application belongs. Terms defined in a general dictionary may be interpreted with the same meaning as the meaning in the context of the related art and are not to be interpreted to have ideal or excessively formal meanings unless specifically defined as such.

In order to make the purpose, technical solution and advantage of the present application clearer, the following is a further detailed description of the implementation of the present application in conjunction with the accompanying drawings.

Embodiment 1

Figure 1:
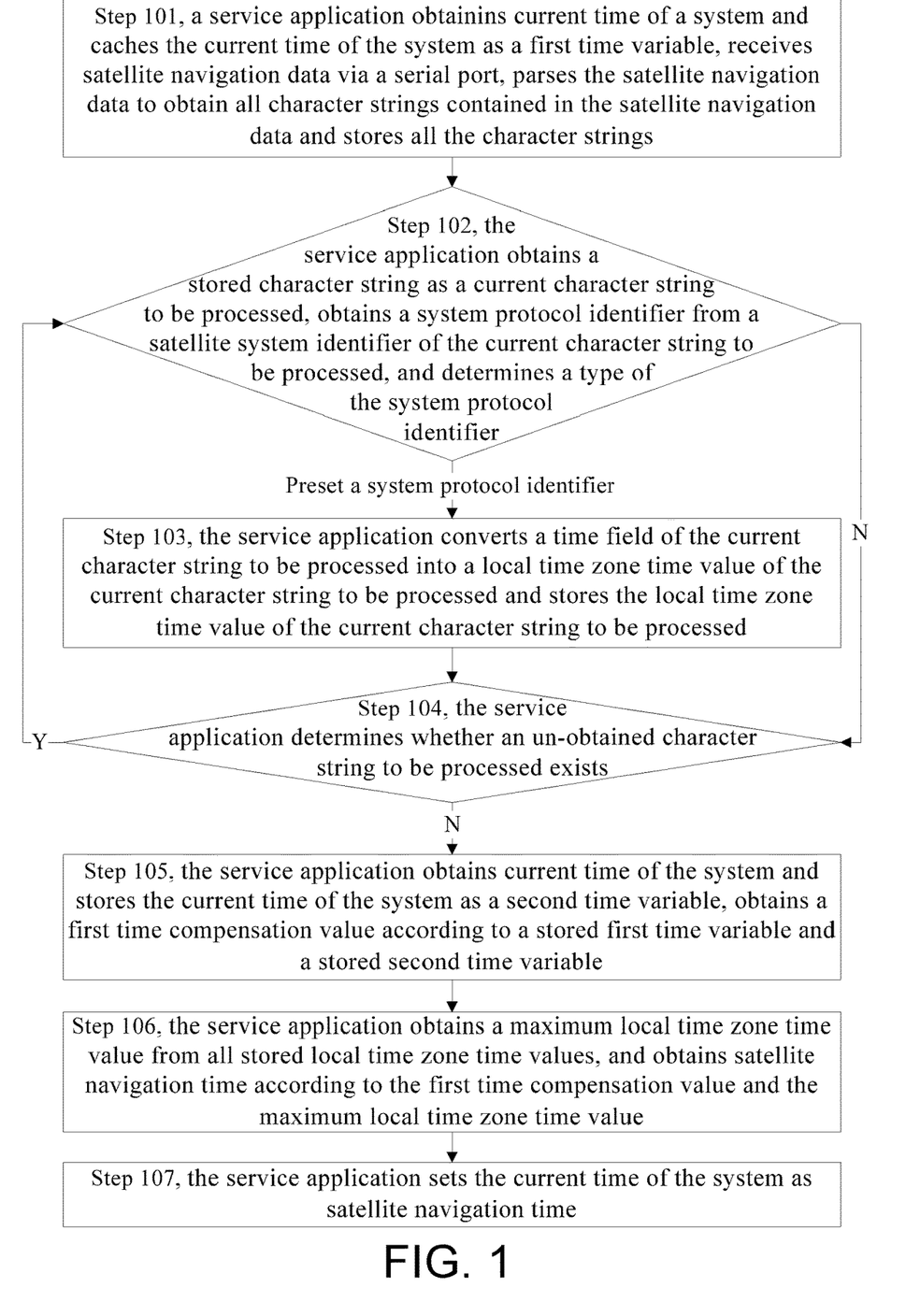
FIG. 1 is a flow chart for a method for synchronizing time by parsing satellite navigation data provided by Embodiment 1 of the present application.

Embodiment 1 of the present application provides a method for synchronizing time by parsing satellite navigation data. As shown by FIG. 1, the method includes following steps:

Step 101, a service application obtains current time of a system and caches the current time of the system as a first time variable, receives satellite navigation data via a serial port, parses the satellite navigation data to obtain all character strings contained in the satellite navigation data and stores all the character strings;

Step 102, the service application obtains a stored character string as a current character string to be processed, obtains a system protocol identifier from a satellite system identifier of the current character string to be processed, and determines a type of the system protocol identifier, if the type of the system protocol identifier is a preset system protocol identifier, executes Step 103; otherwise, executes Step 104;

Step 103, the service application converts a time field of the current character string to be processed into a local time zone time value of the current character string to be processed and stores the local time zone time value of the current character string to be processed, and executes Step 104;

Step 104, the service application determines whether an un-obtained character string to be processed exists, if yes, goes back to Step 102; otherwise, executes Step 105;

Step 105, the service application obtains current time of the system and stores the current time of the system as a second time variable, obtains a first time compensation value according to a stored first time variable and a stored second time variable;

Step 106, the service application obtains a maximum local time zone time value from all stored local time zone time values, and obtains satellite navigation time according to the first time compensation value and the maximum local time zone time value;

Step 107, the service application sets the current time of the system as satellite navigation time.

Optionally, in an embodiment, Step 101 further includes: the service application sets a second time compensation value as an initial value.

Step 102 further includes: if the service application determines that the type of the system protocol identifier is a third system protocol identifier, the service application determines whether a time field exists in the current character string to be processed, if yes, the service application updates the second time compensation value by using the time field of the current character string to be processed, and executes Step 104, otherwise, executes Step 104 directly.

Correspondingly, Step 106 is specifically: the service application obtains a maximum local time zone time value from all stored local time zone time values, obtains the satellite navigation time according to the first time compensation value, the second time compensation value and the maximum local time zone time value.

Optionally, in the embodiment, the determining whether the time field exists in the current character string to be processed is specifically: the service application splits the current character string to be processed according to a fourth preset identifier to obtain all fields contained in the current character string to be processed, determines whether a number of all fields contained in the current character string to be processed is a first preset value, if yes, determines that a time field exists in the current character to be processed, otherwise, determines that a time field does not exist in the current character to be processed.

Optionally, in the embodiment, in Step 101, the parsing the satellite navigation data to obtain all character strings contained in the satellite navigation data and storing all the character strings is specifically: the service application splits the satellite navigation data according to a first preset identifier to obtain all character strings contained in the satellite navigation data and stores all the character strings contained in the satellite navigation data in a first storage area.

Optionally, in the embodiment, the service application splits the satellite navigation data according to the first preset identifier to obtain all the character strings contained in the satellite navigation data, which is specifically:

Step B1, the service application determines whether a first preset identifier exists in the satellite navigation data, if yes, takes the satellite navigation data as current satellite navigation data to be split, and executes Step B2; otherwise, reports an error and ends;

Step B2, the service application obtains a first preset identifier from a start position of the current satellite navigation data to be split, intercepts data before a currently obtained first preset identifier as a current character string and stores the current character string in a first storage area, takes satellite navigation data to be split after the currently obtained first preset identifier as new current satellite navigation data to be split;

Step B3, the service application determines whether another first preset identifier exists in the current satellite navigation data to be split, if yes, goes back to Step B2; otherwise, the service application takes all character strings of the first storage area to obtain all character strings contained in the satellite navigation data.

Optionally, in the embodiment, before Step 101, the method further includes: the service application registers a component of activating a scheduled thread to the system, and activates the serial port in the activated scheduled thread.

Optionally, in the embodiment, the service application registers the component of activating the scheduled thread to the system, and activates the serial port in the activated scheduled thread, which specifically includes:

Step A1, the service application registers a component of time service and a component of a daemon service to the system;

Step A2, the service application monitors a status of the component of time service in the component of daemon service;

Step A3, the service application determines whether the status of the component of time service is alive, if yes, executes Step A4; otherwise, executes Step A5;

Step A4, the service application registers a component of auto-broadcasting after startup to the system, monitors startup broadcast of a terminal in the component of auto-broadcasting after startup, and determines whether the startup broadcast is received, if yes, executes Step A5; otherwise, keeps executing Step A4;

Step A5, the service application activates the component of time service, and activates the scheduled thread in the component of time service;

Step A6, the service application activates the serial port in the scheduled thread, determines whether the activating is successful, if yes, executes Step 101; otherwise, reports and error and ends.

Optionally, in the embodiment, in Step 102, before obtaining the system protocol identifier from the satellite system identifier of the current character string to be processed, the method further includes:

Step M1, the service application determines whether a second preset identifier and a third preset identifier exist in the current character string to be processed, if yes, executes Step M2; otherwise, executes Step 104;

Step M2, the service application intercepts the second preset identifier and the third preset identifier from the current character string to be processed to obtain first data to be processed, and intercepts data after the third preset identifier to obtain second data to be processed;

Step M3, the service application performs an XOR operation on the first data to be processed to obtain a first checksum value, compares the first checksum value with the second data to be processed, if they are matched, the service application obtains a system protocol identifier of the current character string to be processed, if they are not matched, executes Step 104.

Optionally, in the embodiment, the obtaining the system protocol identifier from the satellite system identifier of the current character string to be processed specifically includes:

Step N1, the service application obtains a first fourth preset identifier of the current character string to be processed, intercepts data before the first fourth preset identifier of the current character string to be processed to obtain a satellite system identifier of the current character string to be processed;

Step N2, the service application compares the satellite system identifier of the current character string to be processed with a preset satellite system identifier, if they are matched, keeps on executing a process of determining the type of the system protocol identifier, if they are not matched, executes Step 104.

Optionally, in the embodiment, between Step 102 and Step 103, the method further includes: the service application splits the current character string to be processed according to the fourth preset identifier to obtain all fields contained in the current character string to be processed, determines the time field of the current character string to be processed according to the satellite system identifier of the current character string to be processed.

Optionally, in the embodiment, the service application splits the current character string to be processed according to the fourth preset identifier to obtain all the fields contained in the current character string to be processed, which specifically includes:

Step C1, the service application obtains the fourth preset identifier from a start position of the current character string to be processed, intercepts data before a currently obtained fourth preset identifier to obtain a field of the current character string to be processed and stores the field of the current character string to be processed, takes data after the currently obtained fourth preset identifier as a new current character string to be processed;

Step C2, the service application determines whether another fourth preset identifier exists in the current character string to be processed, if yes, goes back to Step C1, otherwise, executes Step C3;

Step C3, the service application obtains all stored fields to get all fields of the current character string to be processed.

Optionally, in the embodiment, the determining the time field of the current character string to be processed according to the satellite system identifier of the current character string to be processed specifically includes:

Step D1, the service application determines a type of the preset system protocol identifier, if the type of the preset system protocol identifier is a first system protocol identifier, executes Step D2; if the type of the preset system protocol identifier is a second system protocol identifier, executes Step D3;

Step D2, the service application obtains a second field and a tenth field of the current character string to be processed, and concatenates the tenth field and the second field orderly to obtain the time field of the current character string to be processed;

Step D3, the service application obtains a second field, a third field, a fourth field and a fifth field of the current character string to be processed, and concatenates the fifth field, the fourth field, the third field and the second field orderly to obtain the time field of the current character string to be processed.

Optionally, in the embodiment, before Step 107, the method further includes: the service application performs an operation that the second time variable minus satellite navigation time to obtain a millisecond difference value, and determines whether the millisecond difference value is more than a second preset value, if yes, executes Step 107; otherwise, goes back to Step 101.

Optionally, in the embodiment, the obtaining the first time compensation value according to a stored first time variable and a stored second time variable is specifically: the service application obtains the stored first time variable, performs an operation that the second time variable minus the first time variable to obtain the first time compensation value.

Optionally, in the embodiment, the obtaining the satellite navigation time according to the first time compensation value and the maximum local time zone time value is specifically: the service application performs an operation that the maximum local time zone time value plus the first time compensation value to obtain satellite navigation time.

The present embodiment provides a method for synchronizing time by parsing satellite navigation data, in which different navigation time of a satellite is obtained by parsing the satellite navigation data, a local time zone time value with a minimum error is determined according to the comparison of different navigation time of the satellite, thereby improving accuracy of synchronizing local system time.

Embodiment 2

Figure 2A:
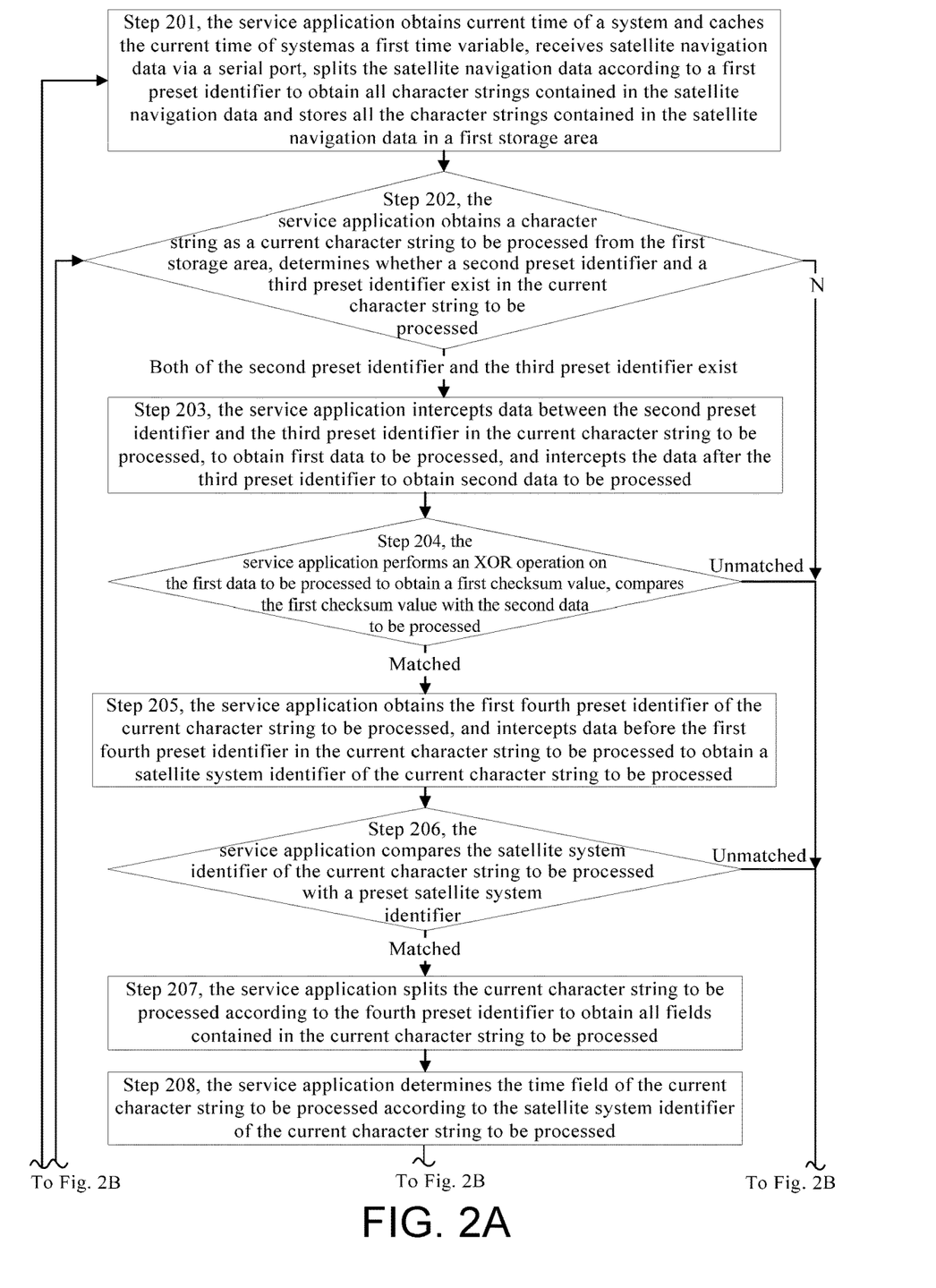
FIG. 2A and FIG. 2B are flow charts for a method for synchronizing time by parsing satellite navigation data provided by Embodiment 2 of the present application.
Figure 2B:
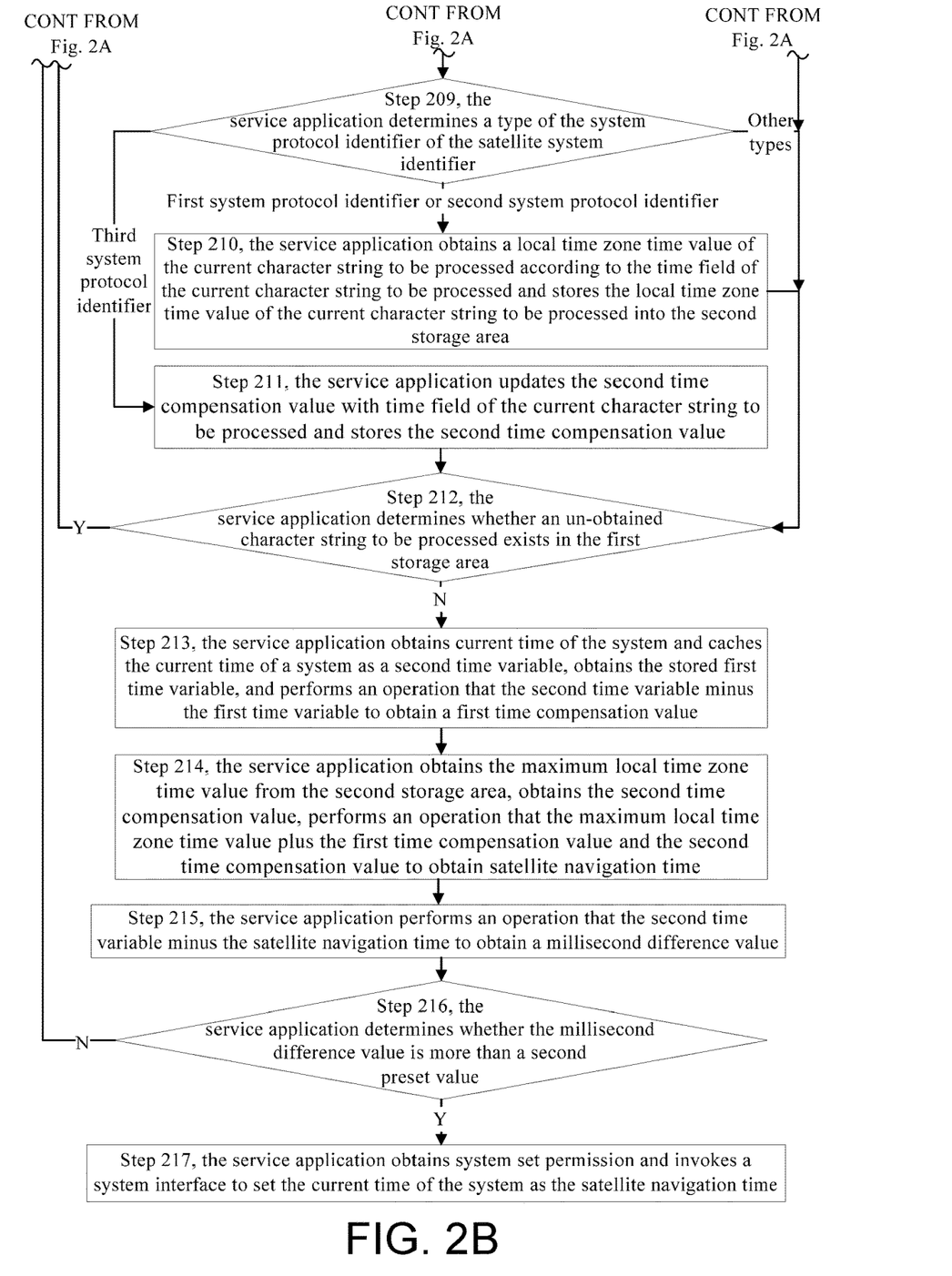

Embodiment 2 of the present application provides a method for synchronizing time by parsing satellite navigation data. As shown by FIG. 2A and FIG. 2B, the method includes the following steps.

Step 201, the service application obtains current time of a system and caches the current time of system as a first time variable, receives satellite navigation data via a serial port, splits the satellite navigation data according to a first preset identifier to obtain all character strings contained in the satellite navigation data and stores all the character strings contained in the satellite navigation data in a first storage area.

Optionally, in the embodiment, the service application runs in a system of a device, for example, a vehicle terminal.

Optionally, in the embodiment, the service application receives satellite navigation data, which is specifically: the service application receives satellite navigation data via a serial port.

Optionally, in the embodiment, the splitting the satellite navigation data according to a first preset identifier to obtain all character strings contained in the satellite navigation data and storing all the character strings contained in the satellite navigation data in a first storage area specifically includes:

Step B1, the service application determines whether a first preset identifier exists in the satellite navigation data, if yes, takes the satellite navigation data as satellite navigation data to be split, and executes Step B2, otherwise, reports an error and ends;

Step B2, the service application obtains a first preset identifier from a start position of the satellite navigation data to be split, intercepts data before a currently obtained first preset identifier as a current character string and stores the current character string in a first storage area, takes satellite navigation data to be split after the currently obtained first preset identifier as new satellite navigation data to be split;

Step B3, the service application determines whether another first preset identifier exists in the satellite navigation data to be split, if yes, goes back to Step B2; otherwise, the service application takes all character strings of the first storage area to obtain all character strings contained in the satellite navigation data.

Optionally, in the embodiment, the first preset identifier is specifically: \n\r.

In a possible implementation, before Step 201, the method further includes: the service application registers a component of activating a scheduled thread to the system, and activates the serial port in the activated scheduled thread.

Optionally, the system involved in the present embodiment is specifically: an Android system.

In a possible implementation, the service application registers the component of activating the scheduled thread to the system, and activates the serial port in the activated scheduled thread specifically includes:

Step A1, the service application registers a component of time service and a component of a daemon service to the system;

Step A2, the service application monitors a status of the component of time service in the component of daemon service;

optionally, in the embodiment, the service application monitors a status of the component of a time service via a onCreate function in the component of the daemon service;

Step A3, the service application determines whether the status of the component of time service is alive, if yes, executes Step A4; otherwise, executes Step A5;

Step A4, the service application registers a component of auto-broadcasting after startup to the system, monitors startup broadcast of a terminal in the component of auto-broadcasting after startup, and determines whether the startup broadcast is received if yes, executes Step A5; otherwise, keeps executing Step A4;

optionally, in the embodiment, the monitoring the startup broadcast of the terminal in the component of auto-broadcasting after startup is specifically: the service application monitors the startup broadcast of the terminal via an onRecieve function in the component of auto-broadcasting after startup;

Step A5, the service application activates the component of time service, and activates the scheduled thread in the component of time service.

for example, in the embodiment, the activating the scheduled thread in the component of time service is specifically: the service application activates the scheduled thread by invoking a callback function of onCreate in the component of time service;

Step A6, the service application activates the serial port in the scheduled thread, determines whether activating is successful, if yes, executes Step 201; otherwise, reports an error and end the procedure;

for example, in an embodiment, the satellite navigation data received by the service application is specifically:
1 $GNRMC,032008.981,A,4001.0872,N,11620.6776,E, 0.00,133.52,150920,,, A*7C\n\r
$GNVTG,133.52,T,,M,0.00,N,0.00,K,A*25\n\r
$GNZDA,032009.001,15,09,2020,00,00*4D\n\r
$GPTXT,01,01,02,LS=1,1,2,2,0,148,7,82, −1,0, −39344868*5B\n\r;

the time variable is specifically: 1600111206090;
the service application splits the received satellite navigation data into four character strings according to the first preset identifier \n\r; and the four character strings are specifically:
$GNRMC,032008.981,A,4001.0872,N,11620.6776,E, 0.00,133.52,150920,,, A*7C;
$GNVTG,133.52,T,,M,0.00,N,0.00,K,A*25;
$GNZDA,032009.001,15,09,2020,00,00*4D;
$GPTXT,01,01,02,LS=1,1,2,2,0,148,7,82, −1,0, −39344868*5B.

Step 202, the service application obtains a character string as a current character string to be processed from the first storage area, determines whether a second preset identifier and a third preset identifier exist in the current character string to be processed, if both of the second preset identifier and the third preset identifier exist, executes Step 203; otherwise, executes Step 212.

Optionally, in the embodiment, the second preset identifier is specifically: $: the third preset identifier is specifically: *.

For example, the current character string to be processed is specifically: $GNRMC,032008.981,A,4001.0872,N, 11620.6776,E,0.00,133.52,150920,,,A*7C, in which both of $ and * exist, and Step 203 is executed.

Step 203, the service application intercepts data between the second preset identifier and the third preset identifier in the current character string to be processed, to obtain first data to be processed, and intercepts the data after the third preset identifier to obtain second data to be processed.

For example, the first data to be processed is specifically:
GNRMC,032008.981,A,4001.0872,N,11620.6776,E, 0.00,133.52,150920,,,A;
the second data to be processed is specifically: 7C.

Step 204, the service application performs an XOR operation on the first data to be processed to obtain a first checksum value, compares the first checksum value with the second data to be processed, if they are matched, executes Step 205; if they are not matched, executes Step 212.

Optionally, in the embodiment, the service application performs the XOR operation on the first data to be processed to obtain the first checksum value is specifically: the service application invokes a system byte convert function to convert the first data to be processed into a first byte array to be processed, performs an XOR operation on data of the first two bytes in the first byte array to be processed to obtain a first XOR operation value, performs an XOR operation on the first XOR operation value and data of the third byte of the in the first byte array to be processed to obtain a second XOR operation value; . . . and so on, then a first checksum value is obtained.

For example, the first checksum value is 7C and the second data to be processed is 7C as well, therefore, they are matched, and Step 205 is executed.

Step 205, the service application obtains the first fourth preset identifier of the current character string to be processed, and intercepts data before the first fourth preset identifier in the current character string to be processed to obtain a satellite system identifier of the current character string to be processed.

Optionally, in the embodiment, the fourth preset identifier is specifically: ",".

For example, the satellite system identifier of the current character string to be processed is specifically: $GNRMC.

Step 206, the service application compares the satellite system identifier of the current character string to be processed with a preset satellite system identifier, if they are matched, executes Step 207, and if they are not matched, executes Step 212.

Optionally, in the embodiment, there are several preset satellite system identifiers.

Optionally, in the embodiment, the preset satellite system identifiers are specifically: a first preset satellite system identifier, i.e. $BDRMC, a second preset satellite system identifier, i.e. $ GNRMC, a third preset satellite system identifier, i.e. $GNZDA, a fourth preset satellite system identifier, i.e. $BDZDA, a fifth preset satellite system identifier, i.e. $GPTXT and a sixth preset satellite system identifier, i.e. $BDTXT.

Correspondingly, the service application compares the satellite system identifier of the current character string to be processed with a preset satellite system identifier, which is specifically: the service application compares the satellite system identifier of the current character string to be processed with the first preset satellite system identifier, the second preset satellite system identifier, the third preset satellite system identifier, the fourth preset satellite system identifier, the fifth preset satellite system identifier and the sixth preset satellite system identifier one by one, if the satellite system identifier of the current character string to be processed is the same as one of the first preset satellite system identifier, the second preset satellite system identifier, the third preset satellite system identifier, the fourth preset satellite system identifier, the fifth preset satellite system identifier and the sixth preset satellite system identifier, they are matched, otherwise, they are not matched.

Further and optionally, the service application compares the satellite system identifier with the first preset satellite system identifier, the second preset satellite system identifier, the third preset satellite system identifier, the fourth preset satellite system identifier, the fifth preset satellite system identifier and the sixth preset satellite system identifier one by one, which is specifically: the service application takes the satellite system identifier of the current character string to be processed as parameter to invoke a first preset function, determines whether they are matched according to a return value of the first preset function, if the return value of the first preset function is true, it means that they are matched; and if the return value of the first preset function is false, it means that they are not matched.

Optionally, in the embodiment, the first preset function is a user defined function.

For example, the satellite system identifier of the current character string to be processed, i.e. $GNRMC, is the same as the second preset satellite system identifier, i.e. $ GNRMC, they are matched, and then Step 207 is executed.

Step 207, the service application splits the current character string to be processed according to the fourth preset identifier to obtain all fields contained in the current character string to be processed.

Optionally, in the embodiment, the fourth preset identifier is specifically: ,;

Optionally, in the embodiment, the splitting the current character string to be processed according to the fourth preset identifier to obtain all fields contained in the current character string to be processed is specifically:

Step C1, the service application obtains a fourth preset identifier from a start position of the current character string to be processed, intercepts data before the currently obtained fourth preset identifier to obtain a field of the current character string to be processed and stores the obtained field, takes data after the currently obtained fourth preset identifier as a new current character string to be processed;

Step C2, the service application determines whether another fourth preset identifier exists in the current character string to be processed, if yes, executes Step C1, otherwise, executes Step C3;

Step C3, the service application obtains all stored fields to get all fields of the current character string to be processed.

For example, the service application splits the current character string to be processed, i.e. $GNRMC,032008.981,A,4001.0872,N,11620.6776,E,0.00,133.52,150920,,, A*7C, according to "," to get all fields of the current character string to be processed, i.e. $GNRMC, 032008.981, A, 4001.0872, N, 11620.6776, E, 0.00, 133.52,150920, and A*7C.

Step 208, the service application determines the time field of the current character string to be processed according to the satellite system identifier of the current character string to be processed.

Optionally, in the embodiment, Step 208 is specifically:

Step D1, the service application obtains a system protocol identifier from the satellite system identifier of the current character string to be processed, determines a type of the system protocol identifier, if the type is a first system protocol identifier, executes Step D2; if the type is a second system protocol identifier, executes Step D3; and if the type is a third system protocol identifier, executes Step D4;

Step D2, the service application obtains a second field and a tenth field of the current character string to be processed, concatenates the tenth field and the second field orderly to obtain a time field of the current character string to be processed;

Step D3, the service application obtains a second field, a third field, a fourth field and a fifth field of the current character string to be processed, concatenates the fifth field, the fourth field, the third field and the second field orderly to obtain a time field of the current character string to be processed;

Step D4, the service application obtains a thirteenth field of the current character string to be processed, and takes the thirteenth field as a time field of the current character string to be processed.

Optionally, in the embodiment, the first system protocol identifier is specifically: RMC;

the second system protocol identifier is specifically: ZDA; and the third system protocol identifier is specifically: TXT.

For example, the satellite system identifier of the current character string to be processed is specifically: $GNRMC, the system protocol identifier is the first system protocol identifier RMC, then the second field 032008.981 and the tenth field 150920 are taken from the current character string to be processed and are taken as a time field of the current character string.

Step 209, the service application determines a type of the system protocol identifier of the satellite system identifier, if the type is the first system protocol identifier or the second system protocol identifier, executes Step 210; if the type is the third system protocol identifier, executes Step 211; if the type is of another type, executes Step 212.

Optionally, in this step, if the type is a third system protocol identifier, before executing Step 211, the method further includes: the service application determines whether a time field exist in the current character string to be processed, if yes, executes Step 211, otherwise, executes Step 212.

Optionally, in the embodiment, the service application determines whether a time field exists in the current character string to be processed, which specifically includes: the service application determines whether the number of all fields contained in the current character string to be processed is a first preset value, if yes, it determines that the time field exists in the current character string to be processed, otherwise, it determines that the time field does not exist in the current character string to be processed.

Specifically, in the embodiment, the first preset value is specifically: 13.

For example, in the embodiment, the type of the system protocol identifier is the first system protocol identifier (RMC), and Step 210 is executed.

Step 210, the service application obtains a local time zone time value of the current character string to be processed according to the time field of the current character string to be processed and stores the local time zone time value of the current character string to be processed into the second storage area, and executes Step 212.

Optionally, in the embodiment, Step 210 is specifically: the service application takes the time field of the current character string to be processed as parameter and invokes a system time convert function to obtain a local time zone time value of the current character string to be processed and stores the local time zone time value in the second storage area.

Optionally, in the embodiment, the time field obtained by the service application from the current character string to be processed is specifically a time field in a Universal Time Coordinated (UTC) format, and the local time zone time value is specifically a millisecond value of the time zone in which the system is, for example, a millisecond value of the time zone in which Beijing is located.

Further and optionally, the service application takes the time field of the current character string to be processed as a parameter and invokes a system time convert function to obtain a local time zone time value of the current character string to be processed and stores the local time zone time value in the second storage area, which is specifically: the service application takes the time field in the Universal Time Coordinated format as a parameter and invokes a system time convert function to obtain a millisecond value of the time zone of the current character string to be processed in which Beijing is located and stores the millisecond value in the second storage area.

For example, the local time zone time value of the current character string to be processed is 1600111208981.

Step 211, the service application updates the second time compensation value with time field of the current character string to be processed and stores the second time compensation value, and executes Step 212.

Optionally, in the embodiment, before Step 211, the method further includes: the service application sets the second time compensation value as an initial value.

Step 212, the service application determines whether an un-obtained character string to be processed exists in the first storage area, if yes, goes back to Step 202, otherwise, executes Step 213.

For example, in the embodiment, un-obtained character strings to be processed exist in the first storage area, which are:

$GNVTG,133.52,T,,,M,0.00,N,0.00,K,A*25,
$GNZDA,032009.001,15,09,2020,00,00*4D,
$GPTXT,01,01,02,LS=1,1,2,2,0,148,7,82, −1,0, −39344868*5B.

Therefore, it goes back to Step 202, a process from Step 202 to Step 212 is executed on an un-obtained character string to be processed in the first storage area.

The service application executes the process from Step 202 to Step 212 on all character strings to be processed in the first storage area to obtain local time zone time values of the second storage area, which are 1600111208981 and 1600111209001, the obtained second time compensation value is specifically 1000.

Step 213, the service application obtains current time of the system and caches the current time of a system as a second time variable, obtains the stored first time variable, and performs an operation that the second time variable minus the first time variable to obtain a first time compensation value.

For example, the first time variable is specifically: 1600111206090;
the second time variable is specifically: 1600111206412;
the first time compensation value is specifically: 322.

Step 214, the service application obtains the maximum local time zone time value from the second storage area, obtains the second time compensation value, performs an operation that the maximum local time zone time value plus the first time compensation value and the second time compensation value to obtain satellite navigation time.

For example, the maximum local time zone time value obtained from the second storage area is specifically: 1600111209001;
the first time compensation value is specifically: 322;
the second time compensation value is specifically: 1000;
the satellite navigation time is specifically: 1600111210323.

Step 215, the service application performs an operation that the second time variable minus the satellite navigation time to obtain a millisecond difference value.

For example, the second time variable is specifically: 1600111206412;
the satellite navigation time is specifically: 1600111210323;
the millisecond difference value is specifically: 3911.

Step 216, the service application determines whether the millisecond difference value is more than a second preset value, if yes, executes Step 217, otherwise, goes back to Step 201.

For example, the second preset value is 2000, and the millisecond difference value 3911 is more than the second preset value, then executes Step 217.

Step 217, the service application obtains system set permission and invokes a system interface to set the current time of the system as the satellite navigation time.

Optionally, in the embodiment, the invoking the system interface to set the local time of the system as the satellite navigation time is specifically: the service application invokes a second preset function to convert the satellite navigation time to current time of a system of a local time zone, and sets the current time of the system of local time zone as the satellite navigation time.

For example, the second preset function is specifically: System.out.println(formatToBJDate(" ").getTime( ).

The present embodiment provides a method for synchronizing time by parsing satellite navigation data, in which different navigation time of a satellite is obtained by parsing the satellite navigation data, a local time zone time value with a minimum error is determined according to comparison of different navigation time of the satellite, thereby improving accuracy of synchronizing local system time. Meanwhile, by computing the compensation value of the satellite navigation data, receiving and parsing the time compensation value of the satellite navigation data, accuracy of synchronizing local system time is improved.

Figure 3:
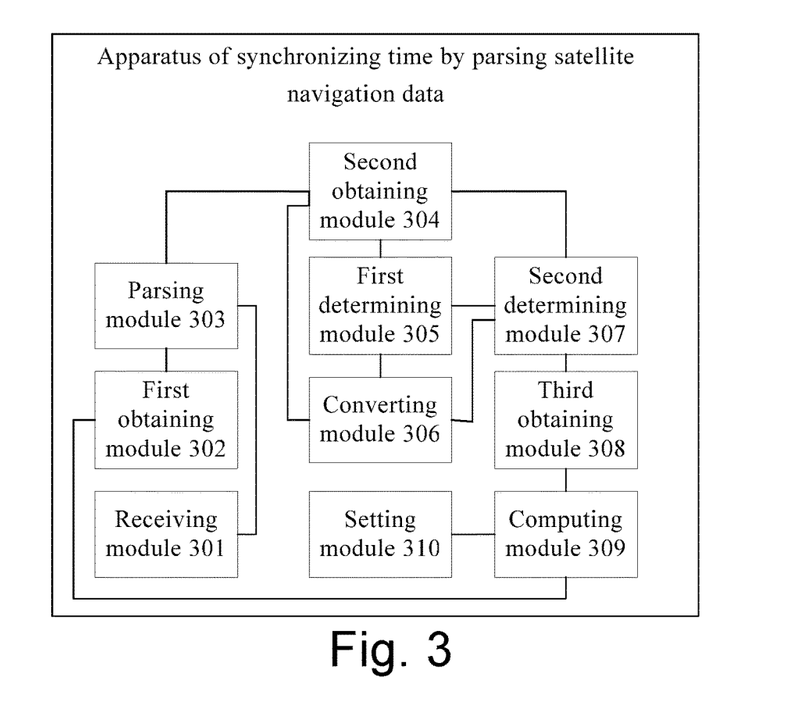
FIG. 3 is a module block diagram of an apparatus for synchronizing time by parsing satellite navigation data provided by Embodiment 2 of the present application.

The present application further provides an apparatus for synchronizing time by parsing satellite navigation data. As shown by FIG. 3, the apparatus includes: a receiving module 301, a first obtaining module 302, a parsing module 303, a second obtaining module 304, a first determining module 305, a converting module 306, a second determining module 307, a third obtaining module 308, a computing module 309 and a setting module 310;

the receiving module 301 is configured to receive satellite navigation data via a serial port;

the first obtaining module 302 is configured to obtain current time of a system and cache the current time of the system as a first time variable;

the parsing module 303 is configured to parse the satellite navigation data to obtain all character strings contained in the satellite navigation data and store all the character strings;

the second obtaining module 304 is configured to obtain a stored character string as a current character string to be processed, obtain a system protocol identifier of the current character string to be processed from the satellite system identifier of the current character string to be processed;

the first determining module 305 is configured to determine a type of the system protocol identifier, if the type is a preset system protocol identifier, trigger the converting module 306; otherwise, trigger the second determining module 307;

the converting module 306 is configured to convert a time field of the current character string to be processed into a local time zone time value of the current character string to be processed and store the local time zone time value of the current character string to be processed, and trigger the second determining module 307;

the second determining module 307 is configured to determine whether an un-obtained character string to be processed exists, if yes, trigger the second obtaining module 304, otherwise, trigger a third obtaining module 308;

the third obtaining module 308 is configured to obtain current time of the system and store the current time of the system as the second time variable;

the computing module 309 is configured to obtain a first time compensation value according to a stored first time variable and a second time variable;

the third obtaining module 308 is further configured to obtain a maximum local time zone time value of all stored local time zone time values;

the computing module 309 is further configured to obtain satellite navigation time according to the first time compensation value and the maximum local time zone time value;

the setting module 310 is configured to set the current time of the system as satellite navigation time.

Optionally, in the embodiment, the apparatus further includes a third determining module and an updating module;

the setting module 310 is further configured to set a second time compensation value as an initial value;

the third determining module is configured to, when the first determining module 305 determines that the type of the system protocol identifier is a third system protocol identifier, determine whether a time field exists in the current character string to be processed, if yes, trigger the updating module; otherwise, trigger the second determining module 307;

the updating module is configured to update the second time compensation value with the time field of the character string to be processed, and trigger the second determining module 307;

the third obtaining module 308 is further configured to obtain the maximum local time zone time value from all stored local time zone time values;

the computing module 309 is specifically configured to obtain the satellite navigation time according to the first time compensation value, the second time compensation value and the maximum local time zone time value.

Optionally, in the embodiment, the third determining module is configured to determine whether a time field exists in the current character string to be processed, which is specifically: the third determining module splits the current character string to be processed according to a fourth preset identifier to obtain all fields contained in the current character string to be processed, determines whether a number of all fields contained in the current character string to be processed is a first preset value, if yes, determines that a time field exists in the current character to be processed, otherwise, determines that a time field does not exist in the current character to be processed.

Optionally, in the embodiment, the parsing module 303 is specifically configured to split the satellite navigation data according to a first preset identifier to obtain all character strings contained in the satellite navigation data and stores all the character strings contained in the satellite navigation data in a first storage area.

Optionally, in the embodiment, the parsing module 303 includes: a first determining unit, a first intercepting unit, an error reporting unit, a second determining unit and a first obtaining unit;

the first determining unit is configured to determine whether a first preset identifier exists in the satellite navigation data, if yes, take the satellite navigation data as current satellite navigation data to be split, and trigger the first intercepting unit, otherwise, trigger the error reporting unit;

the error reporting unit is configured to report an error and end a procedure;

the first intercepting unit is configured to obtain a first preset identifier from a start position of the current satellite navigation data to be split, intercept data before a currently obtained first preset identifier as a current character string and store the current character string in a first storage area, take satellite navigation data to be split after the currently obtained first preset identifier as new current satellite navigation data to be split;

the second determining unit is configured to determine whether another first preset identifier exists in the current satellite navigation data to be split, if yes, trigger the first intercepting unit; otherwise, trigger the first obtaining unit;

the first obtaining unit is configured to take all character strings in the first storage area to obtain all character strings contained in the satellite navigation data.

Optionally, in the embodiment, the apparatus further includes: an activating module;

the activating module is configured to registers a component of activating a scheduled thread to the system, and activate the serial port in the activated scheduled thread.

Optionally, in the embodiment, the activating module specifically includes: a first registering unit, a first monitoring unit, a third determining unit, a second registering unit, a fourth determining unit, a first activating unit and a fifth determining unit;

the first registering unit is configured to register a component of time service and a component of a daemon service to the system;

the first monitoring unit is configured to monitor a status of the component of time service in the component of daemon service;

the third determining unit is configured to determine whether the status of the component of time service is alive, if yes, trigger the second register unit, otherwise, trigger the first activating unit;

the second registering unit is configured to register a component of auto-broadcasting after startup to the system, monitor startup broadcast of a terminal in the component of auto-broadcasting after startup, and trigger the fourth determining unit;

the fourth determining unit is configured to determine whether the startup broadcast is received, if yes, trigger the first activating unit, otherwise, keep on triggering the fourth determining unit;

the first activating unit is configured to activate the component of time service, and activate the scheduled thread in the component of time service;

the fifth determining unit is configured to activate the serial port in the scheduled thread, determine whether the activating is successful, if yes, trigger the receiving module 301, otherwise, report an error and end the procedure.

Optionally, in the embodiment, the apparatus further includes: a fourth determining module and a comparing module;

the fourth determining module is configured to determine whether a second preset identifier and a third preset identifier exist in the current character string to be processed, if both of the second preset identifier and the third preset identifier exist in the current character string to be processed, trigger the first intercepting module, otherwise, trigger the second determining module 307;

the first intercepting module is configured to intercept the second preset identifier and the third preset identifier from the current character string to be processed to obtain first data to be processed, and intercept data after the third preset identifier to obtain second data to be processed;

a comparing module is configured to perform an XOR operation on the first data to be processed to obtain a first checksum value, compare the first checksum value with the second data to be processed, if they are matched, obtain a system protocol identifier of the current character string to be processed, if they are not matched, trigger the second determining module 307.

Optionally, in the embodiment, the second obtaining module 304 is configured to obtain the system protocol identifier from the satellite system identifier of the current character string to be processed, which specifically includes: the second obtaining module 304 obtains the first fourth preset identifier of the current character string to be processed, intercepts data before the first fourth preset identifier of the current character string to be processed to obtain a satellite system identifier of the current character string to be processed, compares the satellite system identifier of the current character string to be processed with a preset satellite system identifier, if they are matched, keeps on executing a process of determining the type of the system protocol identifier, if they are not matched, trigger the second determining module 307.

Optionally, in the embodiment, the apparatus further includes a splitting and determining module;

the splitting and determining module is configured to split the current character string to be processed according to the fourth preset identifier to obtain all fields contained in the current character string to be processed, determine the time field of the current character string to be processed according to the satellite system identifier of the current character string to be processed.

Optionally, in the embodiment, the splitting and determining module specifically includes a second intercepting unit, a sixth determining unit and a second obtaining unit.

the second intercepting unit is configured to obtain the fourth preset identifier from a start position of the current character string to be processed, intercept data before a currently obtained fourth preset identifier to obtain a field of the current character string to be processed and stores the field of the current character string to be processed, and take data after the currently obtained fourth preset identifier as a new current character string to be processed;

the sixth determining unit is configured to determine whether another fourth preset identifier exists in the current character string to be processed, if yes, trigger the second intercepting unit, otherwise, trigger the second obtaining unit;

the second obtaining unit is configured to obtain all stored fields to get all fields of the current character string to be processed.

Optionally, in the embodiment, the splitting and determining module specifically includes: a seventh determining unit, a first concatenating unit and a second concatenating unit;

the seventh determining unit is configured to determine a type of the preset system protocol identifier, if the type is a first system protocol identifier, trigger the first concatenating unit; and if the type is a second system protocol identifier, trigger the second concatenating unit;

the first concatenating unit is configured to obtain a second field and a tenth field of the current character string to be processed, and concatenate the tenth field and the second field orderly to obtain the time field of the current character string to be processed;

the second concatenating unit is configured to obtain a second field, a third field, a fourth field and a fifth field of the current character string to be processed, and concatenate the fifth field, the fourth field, the third field and the second field orderly to obtain the time field of the current character string to be processed.

Optionally, in the embodiment, the computing module 309 is further configured to perform an operation that the second time variable minus satellite navigation time to obtain a millisecond difference value, and determine whether the millisecond difference value is more than a second preset value, if yes, trigger setting module 310; otherwise, trigger the receiving module 301.

Optionally, in the embodiment, the computing module 309 is configured to obtain the first time compensation value according to a stored first time variable and a stored second time variable, which is specifically: the computing module 309 obtains the stored first time variable, performs an operation that the second time variable minus the first time variable to obtain the first time compensation value.

Optionally, in the embodiment, the computing module 309 is configured to obtain the satellite navigation time according to the first time compensation value and the maximum local time zone time value, which is specifically: the computing module 309 performs an operation that the maximum local time zone time value plus the first time compensation value to obtain satellite navigation time.

The present application further provides an electronic device, which includes a processor and a memory;

the memory is configured to a store computer program;

the processor is configured to run the computer program stored by the memory to realize the method for synchronizing time by parsing satellite navigation data.

Figure 4:
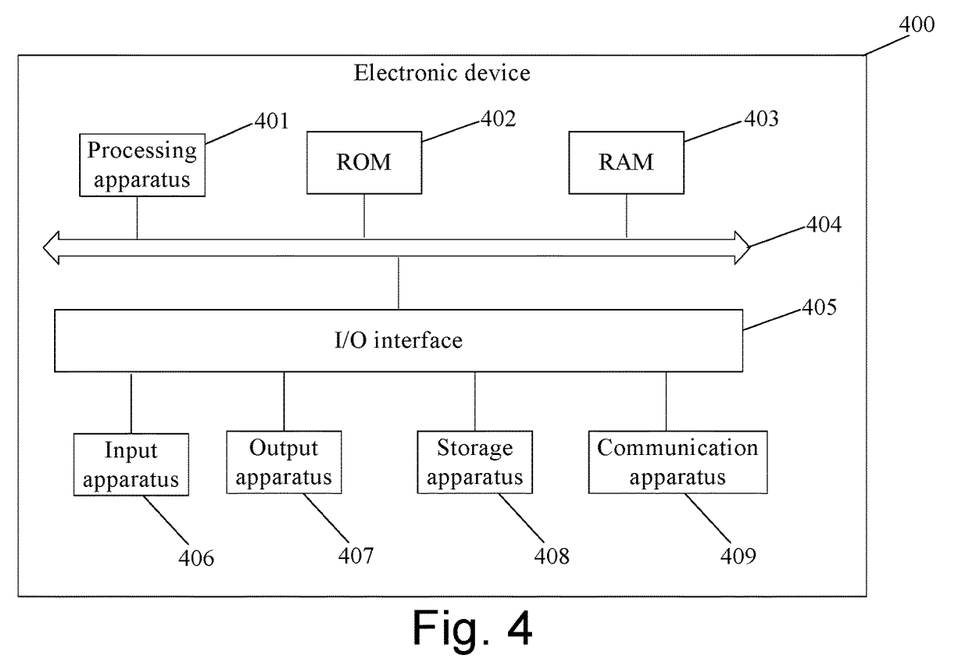
FIG. 4 provides a module block diagram of an electronic device provided by Embodiment 2 of the present application.

The present application provides an electronic device, as shown in FIG. 4, which shows a schematic structural diagram of an electronic device 400 suitable for implementing all embodiments of the present application. The device in the embodiment of the present application may include but not limited to such as a mobile phone, a notebook computer, a digital broadcast receiver, a personal digital assistant (PDA), a tablet computer (PAD), a portable multimedia player (PMP), mobile terminals such as vehicle-mounted terminals (such as vehicle-mounted card reader terminals), and fixed terminals such as digital televisions (TV), desktop computers, and the like. The electronic device shown in FIG. 4 is only an example, and should not limit the functions and the scope of use of the embodiments of the present application.

As shown in FIG. 4, the electronic device 400 may include a processing apparatus (such as a central processing unit, a graphics processing unit, etc.) 401, which can perform various appropriate actions and processes based on a program stored in a read-only memory (ROM) 402 or a program loaded from a storage apparatus 408 into a random access memory (RAM) 403. In the RAM 403, various programs and data necessary for the operation of the electronic device 400 are also stored. The processing apparatus 401, the ROM 402, and the RAM 403 are connected to each other through a bus 404. An input/output (I/O) interface 405 is also connected to the bus 404.

Generally, the following apparatuses can be connected to the I/O interface 405: an input apparatus 406 including, for example, a touch screen, a touchpad, a keyboard, a mouse, a camera, a microphone, an accelerometer, a gyroscope, etc.; an output apparatus 407 including, for example, a liquid crystal display (LCD), a speaker, a vibrator, etc.; a storage apparatus 408 including, for example, a magnetic tape, a hard disk, etc.; and a communication apparatus 409. The communication apparatus 409 may allow the electronic device 400 to perform wireless or wired communication with other devices to exchange data. While FIG. 4 shows the electronic device 400 having various apparatuses, it is to be understood that implementing or having all the apparatuses shown is not a requirement. More or fewer apparatuses may alternatively be implemented or provided.

In particular, according to an embodiment of the present application, the processes described above with reference to the flowcharts can be implemented as a computer software program. For example, an embodiment of the present application includes a computer program product, which includes a computer program carried on a computer readable medium, where the computer program includes a program code for executing the method shown in the flowchart. In such an embodiment, the computer program may be downloaded and installed from a network via the communication apparatus 409, or installed from storage apparatus 408, or installed from the ROM 402. When the computer program is executed by the processing apparatus 401, the above-mentioned functions defined in the methods of the embodiments of the present application are executed.

It should be noted that the above-mentioned computer-readable medium in the present application may be a computer-readable signal medium or a computer-readable storage medium or any combination of the above two. A computer readable storage medium may be, but not limited to, an electrical, magnetic, optical, electromagnetic, infrared, or semiconductor system, apparatus, or device, or any combination of the above. More specific examples of computer-readable storage media may include, but are not limited to, electrical connections having one or more loads, portable computer diskettes, hard disks, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination of the above. In the present application, a computer-readable storage medium may be any tangible medium that contains or stores a program that can be used by or in conjunction with an instruction execution system, apparatus, or device. In the present application, however, a computer-readable signal medium may include a data signal propagated in a baseband or as part of a carrier wave, and the computer-readable signal medium carries a computer-readable program code therein. Such propagated data signals may take many forms, including but not limited to electromagnetic signals, optical signals, or any suitable combination of the above. A computer-readable signal medium may also be any computer-readable medium other than a computer-readable storage medium, which can transmit, propagate, or transmit a program for use by or in conjunction with an instruction execution system, apparatus, or device. The program code contained in the computer readable medium can be transmitted by any appropriate medium, including but not limited to: an electric wire, an optical cable, a radio frequency (RF), etc., or any suitable combination of the above.

The above computer-readable medium may be included in the device described above, or may exist alone and is not assembled in the device.

The above computer-readable medium carries one or more programs, where the one or more programs, when executed by the device, cause the device to execute the method for synchronizing time by parsing satellite navigation data described in the above embodiments.

A computer program code for performing operations of the present application may be written in one or more programming languages or combinations thereof, including object-oriented programming languages such as Java, Smalltalk, C++, and further including conventional procedural programming languages such as "C" languages or similar programming languages. This program code can be completely executed on a user's computer, partially executed on the user's computer, executed as a standalone software package, partially executed on the user's computer and partially executed on a remote computer, or completely executed on a remote computer or a server. In the case involving the remote computer, the remote computer can also be connected to the user's computer via any type of network, including a local area network (LAN) or a wide area network (WAN). Alternatively, a connection can be made to an external computer (e.g., via the Internet using an Internet service provider).

The flowcharts and block diagrams in the drawings illustrate the architecture, the functionality, and the operation of possible implementations of systems, methods, and computer program products according to various embodiments of the present application. In this regard, each block in the flowcharts or block diagrams may represent a module, a program segment, or a portion of codes, which includes one or more executable instructions for implementing the specified logical function(s). It will also be noted that, in some alternative implementations, the functions noted in the blocks may occur out of the order noted in the drawings. For example, two blocks shown in a succession may, in fact, be executed substantially concurrently, or the blocks may sometimes be executed in a reverse order, depending upon the functionality involved. It will also be noted that each block of the block diagrams and/or flowcharts, and combinations of blocks in the block diagrams and/or the flowcharts, can be implemented by special purpose hardware-based systems that perform the specified functions or actions or can be implemented by a combination of special purpose hardware and computer instructions.

A related application described in the embodiments of the present application may be implemented in a software manner, or may be implemented in a hardware manner. Names of the application do not constitute a limitation on the application itself in a specific case.

The present application provides an electronic device, in which different navigation time of a satellite is obtained by parsing the satellite navigation data, and a local time zone time value with a minimum error is determined according to comparison of different navigation time of the satellite, thereby improving accuracy of synchronizing local system time is improved. Meanwhile, by computing the compensation value of the satellite navigation data, parsing a time compensation value of data and a difference value between the obtained local time zone time values though calculation and the local system, accuracy of synchronizing local system time is further improved.

The present application further provides a computer-readable medium, where the computer-readable medium stores computer instructions, and the computer instructions are used to make the computer execute the method for synchronizing time by parsing satellite navigation data described in the above embodiments.

The computer-readable storage medium further provided in the present application is applicable to any embodiment of the method for synchronizing time by parsing satellite navigation data mentioned above, and will not be repeated here.

The present application further provides a computer program product, when running on a computer, the computer program product enables the computer to execute the method for synchronizing time by parsing satellite navigation data of the present application.

The above are only preferred specific implementations of the present application, but the scope of protection of the present application is not limited to this. Changes or substitutes, that any technical personnel familiar in the technical field can easily think of within the scope of technology disclosed in the present application, should be covered within the scope of protection of the present application. Therefore, the scope of protection of the present application should be based on the scope of protection of the claims.

What is claimed is:

1. A method for synchronizing time by parsing satellite navigation data, comprising:
    Step 101, obtaining, by a service application, current time of a system and caching the current time of the system as a first time variable, receiving satellite navigation data via a serial port, parsing the satellite navigation data to obtain all character strings contained in the satellite navigation data and storing all the character strings;
    Step 102, obtaining, by the service application, a stored character string as a current character string to be processed, obtaining a system protocol identifier from a satellite system identifier of the current character string to be processed, determining a type of the system protocol identifier, if the type of the system protocol identifier is a preset system protocol identifier, executing Step 103; otherwise, executing Step 104;
    Step 103, converting, by the service application, a time field of the current character string to be processed into a local time zone time value of the current character string to be processed and storing the local time zone time value of the current character string to be processed, and executing Step 104;
    Step 104, determining, by the service application, whether an un-obtained character string to be processed exists, if the un-obtained character string to be processed exists, going back to Step 102; otherwise, executing Step 105;
    Step 105, obtaining, by the service application, current time of the system and storing the current time of the system as a second time variable, obtaining a first time compensation value according to a stored first time variable and a stored second time variable;
    Step 106, obtaining, by the service application, a maximum local time zone time value from all stored local time zone time values, obtaining satellite navigation time according to the first time compensation value and the maximum local time zone time value; and
    Step 107, setting, by the service application, the current time of the system as satellite navigation time.

2. The method according to claim 1, wherein Step 101 further comprises: setting, by the service application, a second time compensation value as an initial value;
    Step 102 further comprises: if the service application determines that the type of the system protocol identifier is a third system protocol identifier, determining, by the service application, whether a time field exists in the current character string to be processed, if the time field exists in the current character string to be processed, updating, by the service application, the second time compensation value by using the time field of the current character string to be processed, and executing Step 104, otherwise, executing Step 104 directly;
    Step 106 comprises: obtaining, by the service application, a maximum local time zone time value from all stored local time zone time values, obtaining the satellite navigation time according to the first time compensation value, the second time compensation value and the maximum local time zone time value.

3. The method according to claim 2, wherein the determining whether the time field exists in the current character string to be processed comprises: splitting, by the service application, the current character string to be processed according to a fourth preset identifier to obtain all fields contained in the current character string to be processed, determining whether a number of all fields contained in the current character string to be processed is a first preset value, if the number of all the fields contained in the current character string to be processed is the first preset value, determining that a time field exists in the current character to be processed, otherwise, determining that a time field does not exist in the current character to be processed.

4. The method according to claim 1, wherein in Step 101, the parsing the satellite navigation data to obtain all character strings contained in the satellite navigation data and storing all the character strings comprises is: splitting, by the service application, the satellite navigation data according to a first preset identifier to obtain all character strings contained in the satellite navigation data and storing all the character strings contained in the satellite navigation data in a first storage area.

5. The method according to claim 4, wherein the splitting, by the service application, the satellite navigation data according to the first preset identifier to obtain all the character strings contained in the satellite navigation data comprises:
    Step B1, determining, by the service application, whether a first preset identifier exists in the satellite navigation data, if the first preset identifier exists in the satellite navigation data, taking the satellite navigation data as current satellite navigation data to be split, and executing Step B2; otherwise, reporting an error and ending;
    Step B2, obtaining, by the service application, a first preset identifier from a start position of the current satellite navigation data to be split, intercepting data before a currently obtained first preset identifier as a current character string and storing the current character string in a first storage area, taking satellite navigation data to be split after the currently obtained first preset identifier as new current satellite navigation data to be split;
    Step B3, determining, by the service application, whether another first preset identifier exists in the current satellite navigation data to be split, if another first preset identifier exists in the current satellite navigation data to be split, going back to Step B2; otherwise, taking all character strings of the first storage area to obtain all character strings contained in the satellite navigation data.

6. The method according to claim 1, wherein before Step 101, the method further comprises: registering, by the service application, a component of activating a scheduled thread to the system, and activating the serial port in the activated scheduled thread.

7. The method according to claim 6, wherein the registering, by the service application, the component of activating the scheduled thread to the system, and activating the serial port in the activated scheduled thread comprises:

Step A1, registering, by the service application, a component of time service and a component of a daemon service to the system;

Step A2, monitoring, by the service application, a status of the component of time service in the component of daemon service;

Step A3, determining, by the service application, whether the status of the component of time service is alive, if the status of the component of time service is alive, executing Step A4; otherwise, executing Step A5;

Step A4, registering, by the service application, a component of auto-broadcasting after startup to the system, monitoring startup broadcast of a terminal in the component of auto-broadcasting after startup, and determining whether the startup broadcast is received, if the startup broadcast is received, executing Step A5; otherwise, keeping executing Step A4;

Step A5, activating, by the service application, the component of time service, and activating the scheduled thread in the component of time service;

Step A6, activating, by the service application, the serial port in the scheduled thread, determining whether the activating is successful, if the activating is successful, executing Step 101; otherwise, reporting an error and ending.

8. The method according to claim 1, wherein in Step 102, before obtaining the system protocol identifier from the satellite system identifier of the current character string to be processed, the method further comprises:

Step M1, determining, by the service application, whether a second preset identifier and a third preset identifier exist in the current character string to be processed, if the second preset identifier and the third preset identifier exist in the current character string to be processed, executing Step M2; otherwise, executing Step 104;

Step M2, intercepting, by the service application, the second preset identifier and the third preset identifier from the current character string to be processed to obtain first data to be processed, and intercepting data after the third preset identifier to obtain second data to be processed;

Step M3, performing, by the service application, an XOR operation on the first data to be processed to obtain a first checksum value, comparing the first checksum value with the second data to be processed, if the first checksum value and the second data to be processed are matched, obtaining a system protocol identifier of the current character string to be processed, if the first checksum value and the second data to be processed are not matched, executing Step 104.

9. The method according to claim 1, wherein the obtaining the system protocol identifier from the satellite system identifier of the current character string to be processed comprises:

Step N1, obtaining, by the service application, a first fourth preset identifier of the current character string to be processed, intercepting data before the first fourth preset identifier of the current character string to be processed to obtain a satellite system identifier of the current character string to be processed;

Step N2, comparing, by the service application, the satellite system identifier of the current character string to be processed with a preset satellite system identifier, if the satellite system identifier of the current character string to be processed and the preset satellite system identifier are matched, keeping on executing a process of determining the type of the system protocol identifier, if the satellite system identifier of the current character string to be processed and the preset satellite system identifier are not matched, executing Step 104.

10. The method according to claim 1, wherein between Step 102 and Step 103, the method further comprises: splitting, by the service application, the current character string to be processed according to the fourth preset identifier to obtain all fields contained in the current character string to be processed, determining the time field of the current character string to be processed according to the satellite system identifier of the current character string to be processed.

11. The method according to claim 10, wherein splitting, by the service application, the current character string to be processed according to the fourth preset identifier to obtain all the fields contained in the current character string to be processed comprises:

Step C1, obtaining, by the service application, the fourth preset identifier from a start position of the current character string to be processed, intercepting data before a currently obtained fourth preset identifier to obtain a field of the current character string to be processed and storing the field of the current character string to be processed, and taking data after the currently obtained fourth preset identifier as a new current character string to be processed;

Step C2, determining, by the service application, whether another fourth preset identifier exists in the current character string to be processed, if another fourth preset identifier exists in the current character string to be processed, going back to Step C1, otherwise, executing Step C3;

Step C3, obtaining, by the service application, all stored fields to get all fields of the current character string to be processed.

12. The method according to claim 10, wherein the determining the time field of the current character string to be processed according to the satellite system identifier of the current character string to be processed comprises:

Step D1, determining, by the service application, a type of the preset system protocol identifier, if the type of the preset system protocol identifier is a first system protocol identifier, executing Step D2; if the type of the preset system protocol identifier is a second system protocol identifier, executing Step D3;

Step D2, obtaining, by the service application, a second field and a tenth field of the current character string to be processed, and concatenating the tenth field and the second field orderly to obtain the time field of the current character string to be processed;

Step D3, obtaining, by the service application, a second field, a third field, a fourth field and a fifth field of the current character string to be processed, and concatenating the fifth field, the fourth field, the third field and the second field orderly to obtain the time field of the current character string to be processed.

13. The method according to claim 1, wherein before Step 107, the method further comprises: performing, by the service application, an operation that the second time variable minus satellite navigation time to obtain a millisecond difference value, and determining whether the millisecond difference value is more than a second preset value, if the millisecond difference value is more than the second preset value, executing Step 107; otherwise, going back to Step 101.

14. The method according to claim 1, wherein obtaining the first time compensation value according to a stored first time variable and a stored second time variable comprises:
obtaining, by the service application, the stored first time variable, performing an operation that the second time variable minus the first time variable to obtain the first time compensation value.

15. The method according to claim 1, wherein the obtaining the satellite navigation time according to the first time compensation value and the maximum local time zone time value comprises:
performing, by the service application, an operation that the maximum local time zone time value plus the first time compensation value to obtain satellite navigation time.

16. An electronic device, comprising: a processor and a memory;
the memory is configured to store a computer program;
the processor is configured to run the computer program stored by the memory to realize following steps:
Step 101, obtaining current time of a system and caching the current time of the system as a first time variable, receiving satellite navigation data via a serial port, parsing the satellite navigation data to obtain all character strings contained in the satellite navigation data and storing all the character strings;
Step 102, obtaining a stored character string as a current character string to be processed, obtaining a system protocol identifier from a satellite system identifier of the current character string to be processed, determining a type of the system protocol identifier, if the type of the preset system protocol identifier is a preset system protocol identifier, executing Step 103; otherwise, executing Step 104;
Step 103, converting a time field of the current character string to be processed into a local time zone time value of the current character string to be processed and storing the local time zone time value of the current character string to be processed, executing Step 104;
Step 104, determining whether an un-obtained character string to be processed exists, if the un-obtained character string to be processed exists, going back to Step 102; otherwise, executing Step 105;
Step 105, obtaining current time of the system and storing store the current time of the system as a second time variable, obtaining a first time compensation value according to a stored first time variable and a stored second time variable;
Step 106, obtaining a maximum local time zone time value from all stored local time zone time values, obtaining satellite navigation time according to the first time compensation value and the maximum local time zone time value; and
Step 107, setting the current time of the system as satellite navigation time.

17. The electronic device according to claim 16, wherein the processor is further configured to run the computer program stored by the memory to:
set a second time compensation value as an initial value;
if the type of the system protocol identifier is determined to be a third system protocol identifier, determine whether a time field exists in the current character string to be processed, if the time field exists in the current character string to be processed, update the second time compensation value by using the time field of the current character string to be processed, and execute Step 104, otherwise, execute Step 104 directly;
obtain a maximum local time zone time value from all stored local time zone time values, obtain the satellite navigation time according to the first time compensation value, the second time compensation value and the maximum local time zone time value.

18. The electronic device according to claim 16, wherein the processor is further configured to run the computer program stored by the memory to:
split the current character string to be processed according to a fourth preset identifier to obtain all fields contained in the current character string to be processed, determine whether a number of all fields contained in the current character string to be processed is a first preset value, if the number of all fields contained in the current character string to be processed is the first preset value, determine that a time field exists in the current character to be processed, otherwise, determine that a time field does not exist in the current character to be processed.

19. The electronic device according to claim 16, wherein the processor is further configured to run the computer program stored by the memory to:
split the satellite navigation data according to a first preset identifier to obtain all character strings contained in the satellite navigation data and store all the character strings contained in the satellite navigation data in a first storage area.

20. A non-transitory computer readable storage medium, configured to store a computer program which, when running on a computer, enables the computer to execute following steps:
Step 101, obtaining current time of a system and caching the current time of the system as a first time variable, receiving satellite navigation data via a serial port, parsing the satellite navigation data to obtain all character strings contained in the satellite navigation data and storing all the character strings;
Step 102, obtaining a stored character string as a current character string to be processed, obtaining a system protocol identifier from a satellite system identifier of the current character string to be processed, determining a type of the system protocol identifier, if the type of the preset system protocol identifier is a preset system protocol identifier, executing Step 103; otherwise, executing Step 104;
Step 103, converting a time field of the current character string to be processed into a local time zone time value of the current character string to be processed and storing the local time zone time value of the current character string to be processed, executing Step 104;
Step 104, determining whether an un-obtained character string to be processed exists, if the un-obtained character string to be processed exists, going back to Step 102; otherwise, executing Step 105;
Step 105, obtaining current time of the system and storing the current time of the system as a second time variable, obtaining a first time compensation value according to a stored first time variable and a stored second time variable;
Step 106, obtaining a maximum local time zone time value from all stored local time zone time values, obtaining satellite navigation time according to the first time compensation value and the maximum local time zone time value; and Step 107, setting the current time of the system as satellite navigation time.

\* \* \* \* \*